United States Patent [19]

Notari et al.

[11] 4,082,685
[45] Apr. 4, 1978

[54] PROCESS FOR THE PRODUCTION OF ALUMINUM CHLOROHYDROXIDES

[75] Inventors: Bruno Notari; Luigi Rivola, both of San Donato Milanese, Italy

[73] Assignee: Snamprogetti, S.p.A., Milan, Italy

[21] Appl. No.: 562,782

[22] Filed: Mar. 27, 1975

[30] Foreign Application Priority Data

Mar. 28, 1974 Italy .................................. 49835/74

[51] Int. Cl.² ............................. C01F 7/00; C01F 7/22
[52] U.S. Cl. ............................... 252/187 R; 423/126; 423/127; 423/462; 423/495
[58] Field of Search ............... 423/462, 495, 126, 127; 252/187 R

[56] References Cited

U.S. PATENT DOCUMENTS

| | | | |
|---|---|---|---|
| 1,430,449 | 9/1922 | Howard | 423/495 |
| 1,701,510 | 2/1929 | Siearin | 423/126 X |
| 1,796,107 | 3/1931 | Jonas et al. | 423/495 |
| 2,392,153 | 1/1946 | Kastning | 423/462 |
| 2,413,709 | 1/1947 | Hoffman | 423/126 X |
| 2,947,604 | 8/1960 | Laist | 423/126 X |
| 3,909,439 | 9/1975 | Rivola et al. | 252/187 R |

FOREIGN PATENT DOCUMENTS

| | | | |
|---|---|---|---|
| 36-24055 | 12/1961 | Japan | 423/462 |

OTHER PUBLICATIONS

Chem. Abstracts, vol. 46, Apr.–June 1952, p. 5274.
Chem. Abstracts, vol. 55, 1961, p. 11776.

*Primary Examiner*—Leland A. Sebastian
*Attorney, Agent, or Firm*—Ralph M. Watson

[57] ABSTRACT

Aluminum chlorohydroxide represented by the formula $Al_2(OH)_x Cl_y$ in which $x$ and $y$ range from 1 to 4 and 5 to 2, respectively, is produced by reacting hydrochloric acid with an amount of aluminum oxide or hydroxide which is equal to or slightly greater than the stoichiometric amount for obtaining aluminum trichloride, in the temperature range of from 160° to 270° C, and in the pressure range of from 0.1 to 50 kg/cm².

3 Claims, No Drawings

PROCESS FOR THE PRODUCTION OF ALUMINUM CHLOROHYDROXIDES

The present invention relates to a process for the production of aluminum chlorohydroxides.

It is known from our Italian patent application No. 21252 A/72 filed on Mar. 1, 1972, and the corresponding U.S. Pat. No. 3,909,439 that there is a process for the production of aluminum chlorohydroxides having the general formula $$Al_2(OH)_x Cl_y$$

in which $x$ and $y$ may vary from 1 to 3.5 and from 5 to 2.5 respectively. According to this process an aluminum oxide or hydroxide is reacted with hydrochloric acid and the aluminum oxide amount is much higher than the stoichiometric amount necessary for obtaining aluminum trichloride.

The reaction occurs at temperatures comprised from 100° to 160° C and the employed starting material can be selected from alumina Bayer, bauxite, gibsite, hydrayillite, bohemite; as noted above use is made of a large excess thereof with respect to the stoichiometric ratio necessary for obtaining the trichloride derivative, more precisely the amount is 2, 4 or 5 times as high as the stoichiometric amount.

It has now been found, which is the subject of the present invention, that, if the reaction is carried out at higher temperatures, use can be made of an amount of aluminum oxide or hydroxide in the stoichiometric ratio or with only a slight excess with respect to the amount necessary for obtaining chloride and aluminum chlorohydroxides are obtained having the formula given above wherein, however, $x$ ranges from 1 to 4 and $y$ from 5 to 2.

The starting material can be again selected from alumina Bayer, bauxite, gibbsite, hydrargillite, disapore, boehmite, but we wish to emphasize that the use of alumina Bayer ($\alpha$-$Al_2O_3$. $3H_2O$) permits the reaction to be carried out in shorter reaction times and more basic aluminum chlorohydroxides are obtained.

The inventive process consists in treating the starting material with an aqueous solution of hydrochloric acid, at a content of from 30 to 37%, by using stoichiometric ratios of the reactants or a slight excess of alumina, up to a maximum of 50%.

The reaction is carried out at temperatures in the range of from 160° to 270° C and at pressures ranging from 0.1 to 50 kg/cm².

At the end of the reaction, there is a solid consisting essentially of unreacted alumina, which can be separated and again fed to the reaction vessel; also it is now possible to emphasize the advantage obtained from the employment of alumina Bayer with respect to other Al compounds. For instance the use of bauxite in the preliminary etching reaction causes the formation of a solid containing silica and alumina at a ratio depending on the peculiar reaction conditions and on the bauxite type. The different crystallographic structures and the different granulometry cause, as regards bauxite and the other aforesaid minerals, a lower reaction rate which means, at the same temperature, longer reaction times, of the order of magnitude which is 2 to 5 times as high as the other ones.

The working formalities and the possible uses of the obtained chlorohydroxides are as described in U.S. Pat. No. 3,909,439, to which we refer for further details.

EXAMPLE 1

Use was made of alumina Bayer with particles having 40–70 diameter.

The reaction was carried out as follows:

50 kg of dry alumina ($\alpha$-$Al_2O_3$. $3H_2O$) were reacted with 110 kg of hydrochloric acid in an aqueous solution at 33% by weight.

The reaction was carried out in an enameled steel reactor having 160 l useful capacity, equipped with an anchor stirrer rotating at 80 rounds per minute, and by supplying the reactor with nitrogen up to a pressure of 0.5 kg/cm². The temperature was raised from the room temperature to 180° C over a period of 30 minutes, and the reaction was carried out for 4 hours at 180° C the final pressure being 8 kg/cm². At the end there was a precipitate constituted by unreacted alumina ($\alpha$-$Al_2O_3$. $3H_2O$) corresponding to 1% of fed alumina. Therefore the final product did not need any filtration and had an $Al_2O_3$ amount equal to 19.5% and a density, determined at 20° C, equal to 1.40. The chemical analysis confirmed that it was a chlorohydroxide having the formula $Al_2(OH)_3Cl_3$. More particularly the total chemical analysis of the product obtained after the separation of the precipitate was as follows:

| | | |
|---|---|---|
| $Al_2O_3$ | 19.5% | (by weight) |
| Cl | 21.0% | (by weight) |
| Fe | 45 ppm | |
| Na | 0.1% | |
| Ti | 10 ppm | |
| Si | 10 ppm | |
| pH | 0.9 | |

EXAMPLE 2

Use was made of the same material as in the preceding example and the following reaction was carried out:

800 g of dry alumina ($\alpha$-$Al_2O_3$. $3H_2O$) were reacted with 1000 g of hydrochloric acid in an aqueous solution at 37% by weight.

The etching reaction was carried out of a reactor in "Hastelloy B" equipped with a magnetic dragging stirrer rotating at a rate of 200 rounds per minute.

Before starting the reaction, the air of the reactor was replaced by nitrogen to a residual pressure 0.5 Kg/cm².

The temperature was then raised from room temperature to 230° C over a period of 30 minutes, and the reaction was carried out for 6 hours at 230° C the final pressure being 25 kg/cm².

At the end the temperature was lowered to 80° C and 700 g of distilled water were added.

The chemical analysis showed a precipitate constituted by unreacted alumina ($\alpha$-$Al_2O_3$. $3H_2O$) corresponding to 2% of fed alumina.

Therefore the final product did not need any filtration and had an $Al_2O_3$ content equal to 19.5% and a density at 20° C equal to 1.41.

The chemical analysis confirmed an aluminium chlorohydroxide having the formula $Al_2(OH)_4Cl_2$.

More particularly the total chemical analysis of the product obtained through the separation of the precipitate was as follows:

| | |
|---|---|
| $Al_2O_3$ | 19.5% |
| Cl | 14.4% |
| Fe | 45 ppm |
| Na | 0.12% |
| Ti | 10 ppm |

-continued

| | |
|---|---|
| Si | 10 ppm |
| pH | 0.7 |

EXAMPLE 3

The starting material was bauxite, ground in particles having sizes of from 120 to 180 Mesh, of the following composition (by weight)

| | |
|---|---|
| $Al_2O_3$ | 65% |
| $Fe_2O_3$ | 4% |
| $SiO_2$ | 12% |
| $TiO_2$ | 2% |

The reaction was carried out by reacting 145 kg of bauxite and 100 kg of HCl in aqueous solution at 37% by weight.

As to the procedure and the equipment employed, we refer to example 1.

After the introduction of $N_2$ (at 0.5 kg/cm$^2$) into the reactor, the temperature was raised to 180° C over a period of 30 minutes, and the reaction was carried out for 45 hours at 180° C.

At the end of the acid attack, we noted that only 25% of fed bauxite had been dissolved and the residue was the unreacted precipitate.

The chemical analysis of the suspension, after the separation of the precipitate, showed the presence of the following

| | |
|---|---|
| $Al_2O_3$ | 13.5% |
| Cl | 20.7% |
| Fe | 1.5% |

The chemical analysis of the precipitate showed the presence of the following:

| | |
|---|---|
| $Al_2O_3$ | 54% |
| $SiO_2$ | 10% |
| Fe | 0.9% |

Chlorohydroxide obtained thereby had the formula $Al_2(OH)_{1.5}Cl_{4.5}$.

What we claim is:

1. The process of producing aluminum chlorohydroxide represented by the formula: $Al_2(OH)_xCl_y$, wherein $x$ $y$ range from 1 to 4 and 5 to 2, respectively, which consists in reacting hydrochloric acid with an amount of aluminum oxide or aluminum hydroxide which is equal to or slightly greater than the stroichiometric amount for obtaining aluminum trichloride, in the temperature range of from 160° to 270° C and in the pressure range of from 0.1 to 50 kg/cm$^2$.

2. The process according to claim 1, wherein said hydrochloric acid is in aqueous solution at a concentration of 30 to 37% by weight.

3. The process according to claim 1, wherein said hydrochloric acid is reacted with an amount of alumina Bayer which is equal to or slightly greater than the stoichiometric amount for obtaining aluminum trichloride.

* * * * *

UNITED STATES PATENT OFFICE
CERTIFICATE OF CORRECTION

Patent No. 4,082,685      Dated April 4, 1978

Inventor(s) Bruno Notari and Luigi Rivola

It is certified that error appears in the above-identified patent and that said Letters Patent are hereby corrected as shown below:

Column 1, line 26, After "precisely" insert a comma --,--.

Column 3, line 3, Correct the line to read --pH      1.7--.

Column 4, line 19, Correct "xy" to read --x and y--.

*Signed and Sealed this*

*Twenty-first* Day of *November 1978*

[SEAL]

*Attest:*

RUTH C. MASON
*Attesting Officer*

DONALD W. BANNER
*Commissioner of Patents and Trademarks*